Oct. 19, 1965  R. W. HARPER  3,213,348
ALTERNATING-CURRENT SUPPLY SYSTEM
Filed Dec. 30, 1960  3 Sheets-Sheet 1

*INVENTOR.*
ROBERT W. HARPER

BY *John A. Duffy*

AGENT

Oct. 19, 1965 R. W. HARPER 3,213,348
ALTERNATING-CURRENT SUPPLY SYSTEM
Filed Dec. 30, 1960 3 Sheets-Sheet 2

INVENTOR.
ROBERT W. HARPER
BY John A. Duffy
AGENT

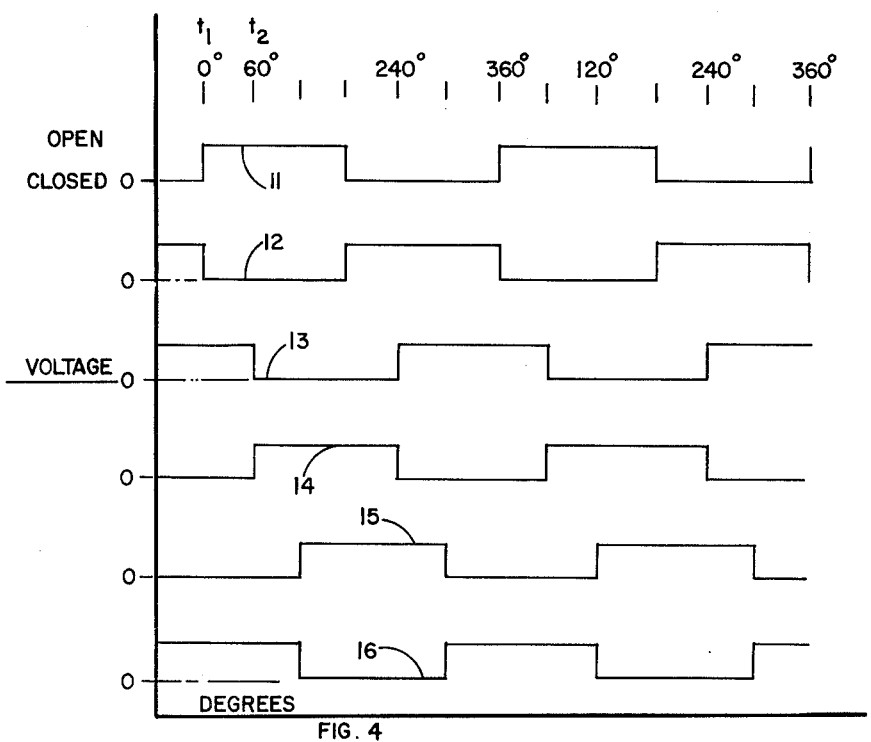

United States Patent Office 3,213,348
Patented Oct. 19, 1965

3,213,348
ALTERNATING-CURRENT SUPPLY SYSTEM
Robert W. Harper, Whittier, Calif., assignor to
North American Aviation, Inc.
Filed Dec. 30, 1960, Ser. No. 79,597
1 Claim. (Cl. 321—5)

This invention relates to alternating-current power supplies and more particularly to a static inverter utilizing transistor switches in a bridge network for producing alternating current from direct current.

The source of power in missiles and aircraft is often a direct-current source such as a battery. Because many of the electrical loads in the missile are alternating current, a suitable inverter means for converting the direct current to alternating current must be provided. The inverter is required to meet stringent reliability, efficiency, and power design criteria. Particularly, the inverter should have characteristics for switching comparatively large amounts of power with minimum losses in the system.

Present day inverters are severely limited in ability to meet the power and efficiency requirements of missile applications. Rotating machine inverters and electronic inverters employing Class B amplifiers of low efficiency are totally unacceptable. Swithching transistor inverters, known in the art as static inverters, which utilize transistors in a switching circuit wherein the transistors are driven from a non-conduction state to a saturated conduction state in the shortest possible time, provide improved efficiency characteristics. However, especially where utilized to supply three-phase alternating current, static inverters in the prior art have been limited in the amount of output power produced. Even static inverters using push pull type switching circuits to provide full wave switching are too limited in power capability to meet some of the power requiremnts of three-phase alternating-current loads.

Accordingly, it is an object of this invention to provide an improved electrical inverter circuit.

In accordance with the device of this invention, a three-phase alternating-current supply system is provided which produces alternating current of relatively large power and minimum transfer loses. A highly reliable and efficient circuit utilizing transistorized circuitry provides alternating current meeting the requirements in missile electric systems.

It is therefore another object of this invention to provide a static inverter with improved power capabilities.

It is still another object of this invention to provide a static inverter with improved reliability and efficiency characteristics.

Other objects of invention will become apparent from the following description read in conjunction with the accompanying drawings in which:

FIG. 4 is a graphical illustration of the outputs of the transistor switches of FIGS. 2 and 3.

Briefly, in accordance with a principal aspect of the invention, a static inverter employing three pairs of transistor switches connected in a bridge circuit provides three-phase alternating current from a primary source of direct current. Each of the pairs is serially connected across the direct-current source and has a common connection for providing one phase of the output alternating current. Each of the switches is selectively driven from a non-conduction state to a saturated conduction state by a three-phase timing control circuit to provide the proper phase relationship between the common connections.

According to other aspects of the invention, there is provided a diode starting circuit for allowing a high voltage to be supplied to an alternating-current load through the output terminals during initial connection of the supply to the load. Additionally, there is included a circuit connected to the output for diverting current from the transistor circuit during cutoff of the supply to an alternating-current inductive load.

Figure 1:
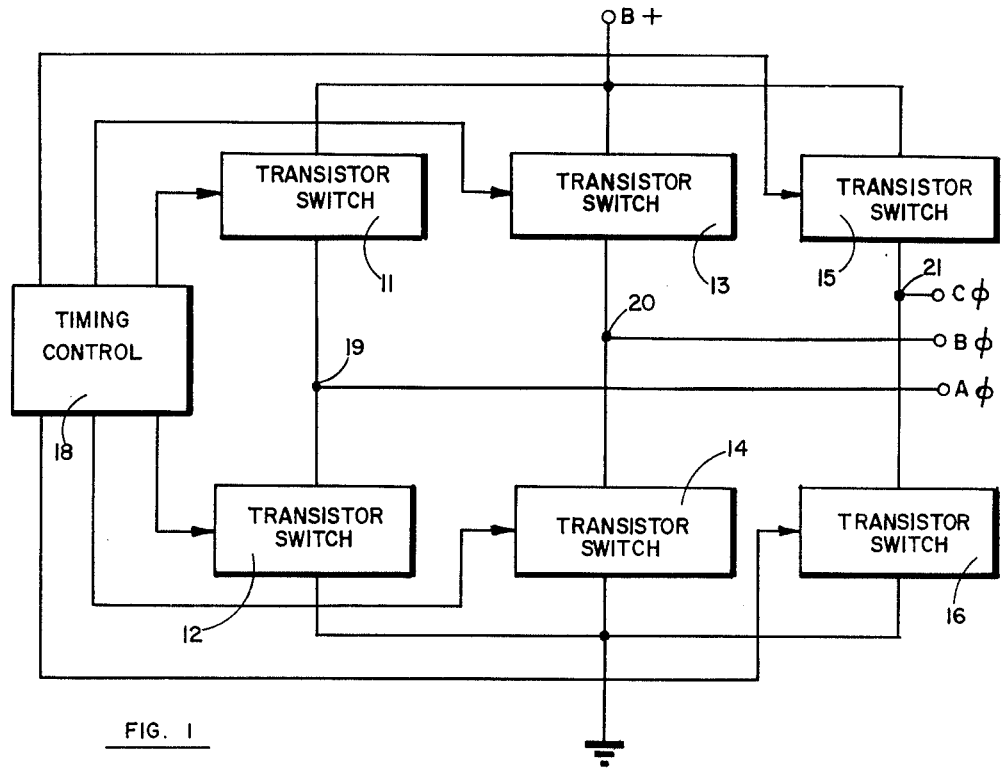
FIG. 1 is a schematic representation in block form of the principles embodying the invention.

Referring now to the drawing, wherein the same part of the invention appearing in more than one figure is designated by the same character, there is illustrated in FIG. 1 a schematic representation in block form of the principles embodying the invention. Primary direct-current power supplied across a B+ terminal and a ground terminal is inverted into three-phase alternating-current power at output terminals A, B, and C by a static inverter circuit. Three pairs of transistor switches are connected in a bridge network to provide alternating current to terminals A, B, and C at common connections 19, 20, and 21. The terminal A is connected to the common connection 19 between transistor switches 11 and 12; the terminal B is connected to the common connection 20 between switches 13 and 14; and the terminal C is connected to the common connection 21 between switches 15 and 16. Each of the switches 11, 13, and 15 is connected to switch direct current from the B+ terminal to connections 19, 20, and 21, respectively. Each of the switches 12, 14, and 16 is connected to switch the current at the connections 19, 20, and 21, respectively, to the ground terminal.

The switches 11-16 are selectively controlled by a timing control means 18 to provide three-phase alternating current at the connections 19, 20, and 21. The pair of switches 11 and 12 ar controlled to conduct and nonconduct 180 degrees out of phase with each other as are the pair 13 and 14 and the pair 15 and 16. The switches 11, 13, and 15 are controlled to conduct 120 degrees out of phase with each other as are the switches 12, 14, and 16. With this type of timing control and the connection of the switches 11–16 in a bridge network, a full wave switching circuit is provided which produces three-phase alternating current at the common connections 19, 20, and 21.

Figure 2:
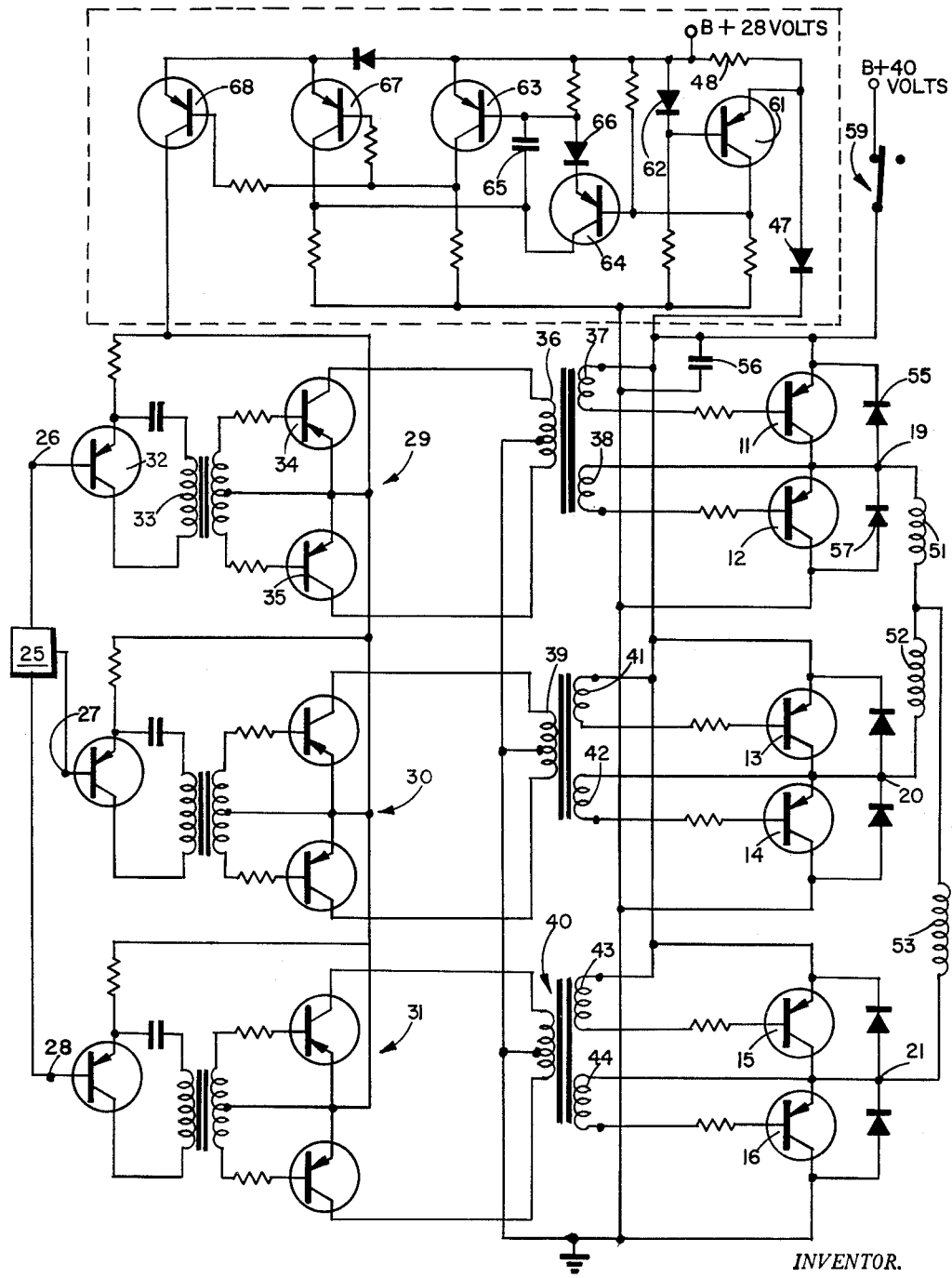
FIG. 2 is a schematic diagram of an electrical circuit according to the principles of the device of FIG. 1.

Referring now to FIG. 2, an electrical circuit embodying the principles of the diagram of FIG. 1, there is shown a frequency standard 25 having three outputs at terminals 26, 27, and 28 which may be square wave signals 120 degrees out of phase with each other. The terminals 26, 27, and 28 are connected to a three-phase driving circuit, including the phases 29, 30, and 31 which amplify the three-phase square wave signals. Each of the phases 29, 30, and 31, phase 29 for example, includes a transistor 32, which has its base connected to the output terminal 26 and its output electrodes coupled through a transformer 33 to drive a pair of transistor amplifiers 34 and 35 in push pull operation to provide an amplified output connected across a primary of a transformer 36. The transformer 36 has a pair of secondary windings 37 and 38 connected to provide control signals 180 degrees out of phase as shown by the polarity dots on the windings. Likewise for phase 30, the transformer 39 has a pair of secondary windings 41 and 42 providing control signals 180 degrees out of phase, and for the phase 31 a transformer 40 has a pair of secondary windings 43 and 44 providing control signals 180 degrees out of phase. The circuit described thus far in FIG. 2 may comprise the timing control means 18 of FIG. 1. The winding 37 is connected across the base-emitter of the transistor 11 and the winding 38 is connected across the base-emitter of the transistor 12, comprising one pair of the transistor switches of FIG. 1. The windings 37 and 38 drive the transistors 11 and 12 alternately from a non-conduction state to a saturated conduction state to provide at the common connection point 19, connected to the collector of transistor 11 and the emitter of transistor 12, a square wave alternating-current signal which forms the output terminal A. Likewise the windings 41 and 42 drive the transistors 13 and 14 alternately to produce a square wave signal at the common connection 20 which forms the output terminal B, and the windings 43 and 44 drive the transistors 15 and 16 to produce a signal at the common connection 21 which forms the output terminal C. Since the signals to the transformers 36, 39 and 40 are 120 degrees out of phase in accordance with the output of frequency standard 25, the signals produced at the output terminals A, B, C form a three-phase alternating-current supply.

The emitters of the transistors 11, 13, and 15 are connected in common through a diode 47 and a resistor 48 to a B+ terminal of 28 volt direct-current source, for example, and the collectors of the transistors 12, 14, and 16 are connected in common to the ground terminal. In this manner, the transistors 11–16 are connected in a bridge network between the source of direct current and the alternating-current output terminals A, B, and C. The terminals A, B, and C may be connected to supply any alternating-current load, such as a three-phase inductive load connected in a wye manner and having load windings 51, 52, and 53.

Each of the transistor switches 11–16, transistor 11 for example, has a clamping diode 55 connected across its emitter-collector circuit to provide a current path from the load winding 51 through the terminal A when the transistor 11 is cut off. A storage capacitor 56 has one plate connected in common to the emitter of the transistors 11, 13, and 15 and the other plate connected in common to the collectors of the transistors 12, 14, and 16 to provide storage for the excess current in the load windings. For example, when the transistor 11 switches from a conduction state to a non-conduction state, excess current stored in the load winding 51 flows through the diode 55 for conventional flow and increases the voltage on the upper plate of storage capacitor 56. Similarly, when the transistor 12 goes from a conduction to non-conduction state, a current path is provided from the lower plate of capacitor 56 through a diode 57 and terminal A to the winding 51. By providing these current paths, greater efficiency and control is obtained during the switching of the transistors.

For alternating-current loads such as motors which require a higher than normal voltage during the initial application of the load, a diode starting gate circuit including the diode 47 is included. A B+ terminal having 40 volts, for example, is connected through a starting switch 59 to supply the power for starting operations. The diode 47 having its cathode connected to the 40 volt B+ terminal is back biased preventing the 28 volt B+ terminal from supplying a lower voltage. The switch 59 may be connected to be responsive to the speed of the motor to open the circuit supplying the 40 volts at a predetermined speed with the 28 volt B+ terminal then supplying the primary power.

In order to protect the alternating-current load for overloads, a circuit is included for turning off the primary source at a predetermined overload. A sensing transistor 61, normally conductive, compares the voltage drop across the resistor 48, which is directly proportional to the load current, to the voltage across a reference diode 62. Upon an occurrence of an overload, transistor 61 is cut off and in turn, operates to cause normally cut off transistors 63 and 64 to conduct. A capacitor 65 connected across the emitter and collector of the transistor 64 is discharged through a diode 66 by the conducting transistor 64. The transistor 64 operates to cut off normally conducting transistors 67 and 68. The transistor 68 is connected in series between the B+ terminal and a common connection to each of the phases 29, 30, and 31 and when the transistor 68 is cut off, direct current operating potentials are removed from the driver stages connected to the terminals 26, 27, and 28, allowing the alternating-current output at the terminals A, B, and C to drop to zero. Meanwhile, the capacitor 65 is charging, reaching a point wherein the transistor 67 is caused to conduct again due to the decreasing conduction in the transistor 63. Transistor 63 cuts off, causing normal conduction in transistors 67 and 68. If the overload current still exists, the transistor 61 will again sense this in the resistor 48 and the cycle will repeat until the overload is removed.

Figure 3:
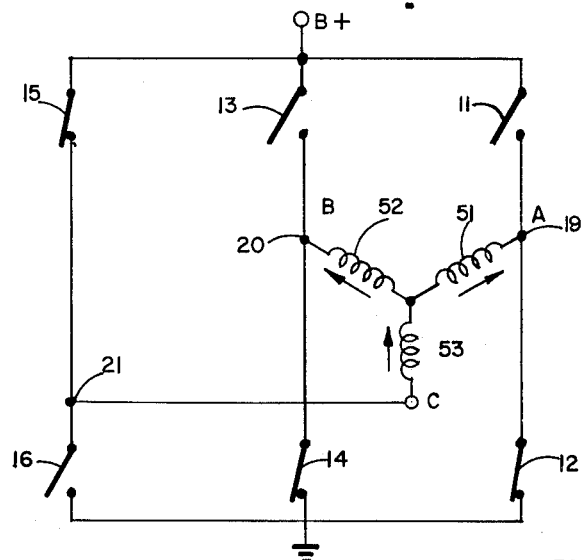
FIG. 3 is a schematic illustration of the functional aspects of the switching circuit of FIG. 2.

Referring now to the schematic illustration in FIG. 3, taken with the graphical illustration in FIG. 4, the switching operation of the transistors 11–16 of FIG. 2 may be readily explained. In FIG. 3, each of the transistors 11–16 of FIG. 2 is illustrated as a switch. In FIG. 4, a waveform is illustrated for each of the transistors 11–16 taken at the connections 19, 20, and 21 in the bridge network. The switches 11–16 are selectively controlled according to the circuit of FIG. 2 to provide three-phase alternating-current at the terminals A, B, and C in the following manner:

In the beginning in FIG. 4 at time $t_1$, it may be seen that the switch 11 has just been cut off and the switch 12 has been just turned on. The switches 14 and 15 are on and the switches 13 and 16 are cut off. Current now flows from B+ through the switch 15, to the common connection 21 and terminal C, through the load winding 53 and load windings 51 and 52 in parallel to the ground terminal through switches 12 and 14. At the time $t_2$, which corresponds to a phase advance of 60 degrees, the switch 13 is turned on and the switch 15 is cut off with the switches 12 and 15 remaining on and the switches 11 and 16 remaining off. Current now flows from B+ in parallel through the switches 13 and 15 to the terminals B and C and respective load windings 52 and 53 and combined in winding 51 to the terminal A and from there through the switch 12 to the ground terminal. The sequence of operation continues with a new pair of switches being turned on and off every 60 degrees to generate a three-phase alternating-current output across the load windings 51, 52, and 53.

The device of applicant's invention, as shown in the embodiment of FIG. 2, provides an efficient and reliable static inverter which is adapted to supply a relatively large amount of alternating-current power. The connection of three pair of switching transistors in a bridge network allows the full usage of the available power from the direct-current source.

Although the invention has been described and illustrated in detail, it is to be clearly understood that the same is by way of illustration and example only and is not to be taken by way of limitation, the spirit and scope of this invention being limited only by the terms of the appended claim.

I claim:

In an inverter for providing alternating current to a load from a source of direct current the combination of, a direct-current source, said plurality of pairs series connected across said source with one output electrode of one of said transistors connected to the positive terminal of said source and one output electrode of the other said transistor connected to the negative terminal of said source, the other output electrodes of said transistors forming a common connection, control means including means for generating three alternating signals of the same frequency displaced apart by 120 electrical degrees, reversing means for generating an inverted timing signal from each one of said displaced signals, and means for connecting one timing signal and one corresponding inverted timing signal respectively to each one of said control electrodes of said transistors forming said plurality of transistor switching means for causing alternate conduction and non-conduction in said transistors to provide an alternating-current signal at said common connection adapted to supply said load, a storage capacitor connected across said source and said one output electrodes, a first diode connected across the output electrodes of said one transistor and poled in a direction to provide a current path from said load to said capacitor when said one transistor changes from conduction to non-conduction, a second diode connected across the output electrodes of said other transistor and poled in a direction to provide a current path from said load to said capacitor when said other transistor changes from conduction to non-conduction, and overload protection means for turning off said means for causing alternate conduction and non-conduction and thereby maintaining said transistors in a non-conductive state in response to a predetermined overload condition.

References Cited by the Examiner

UNITED STATES PATENTS

| | | | |
|---|---|---|---|
| 2,623,203 | 12/52 | Demuth | 321—5 |
| 2,912,634 | 11/59 | Peoples | 321—5 |
| 2,916,687 | 12/59 | Cronin | 321—5 |
| 2,953,735 | 9/60 | Schmidt | 321—45 |
| 3,037,158 | 5/62 | Schmidt | 321—14 |
| 3,052,833 | 9/62 | Coolidge et al. | 321—5 |

OTHER REFERENCES

Electronic Industries, January 1959, pages 02–05 relied on.

LLOYD McCOLLUM, *Primary Examiner.*

SAMUEL BERNSTEIN, RALPH D. BLAKESLEE,
*Examiners.*

UNITED STATES PATENT OFFICE
CERTIFICATE OF CORRECTION

Patent No. 3,213,348                                October 19, 1965

Robert W. Harper

It is hereby certified that error appears in the above numbered patent requiring correction and that the said Letters Patent should read as corrected below.

Column 4, line 63, after "of," insert -- a plurality of pairs of transistors --.

Signed and sealed this 27th day of September 1966.

(SEAL)
Attest:

ERNEST W. SWIDER                              EDWARD J. BRENNER
Attesting Officer                                     Commissioner of Patents